United States Patent
Egawa et al.

(10) Patent No.: US 9,482,936 B2
(45) Date of Patent: Nov. 1, 2016

(54) PROJECTOR WITH TILT PROJECTION

(71) Applicant: SEIKO EPSON CORPORATION, Tokyo (JP)

(72) Inventors: Akira Egawa, Shiojiri (JP); Shigeo Nojima, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 99 days.

(21) Appl. No.: 14/466,150

(22) Filed: Aug. 22, 2014

(65) Prior Publication Data
US 2015/0062538 A1 Mar. 5, 2015

(30) Foreign Application Priority Data
Sep. 3, 2013 (JP) ................................. 2013-182061

(51) Int. Cl.
| | |
|---|---|
| *G03B 21/14* | (2006.01) |
| *G02B 27/42* | (2006.01) |
| *G03B 21/20* | (2006.01) |
| *G03B 33/12* | (2006.01) |

(52) U.S. Cl.
CPC ......... *G03B 21/147* (2013.01); *G02B 27/4205* (2013.01); *G03B 21/208* (2013.01); *G03B 21/2033* (2013.01); *G03B 33/12* (2013.01)

(58) Field of Classification Search
CPC G03B 21/28; G03B 21/208; G03B 21/2033; H04N 9/3105; H04N 9/3166; G02B 17/08; G02B 17/0892
See application file for complete search history.

(56) References Cited

U.S. PATENT DOCUMENTS

| | | | | |
|---|---|---|---|---|
| 6,424,471 | B1 * | 7/2002 | Ulrich .................... | G02B 17/08 |
| | | | | 359/649 |
| 7,583,875 | B2 | 9/2009 | Yamamuchi et al. | |
| 8,089,041 | B2 | 1/2012 | Takagi et al. | |
| 2002/0030813 | A1 * | 3/2002 | Norton ...................... | G01J 3/02 |
| | | | | 356/327 |
| 2007/0040997 | A1 * | 2/2007 | Yamauchi ............. | G02B 27/46 |
| | | | | 353/97 |
| 2007/0268458 | A1 * | 11/2007 | Lee ...................... | H04N 9/3132 |
| | | | | 353/31 |
| 2008/0192359 | A1 * | 8/2008 | Sohmer ............. | G02B 17/0892 |
| | | | | 359/649 |
| 2009/0262629 | A1 * | 10/2009 | Yamasaki ............ | G11B 7/1275 |
| | | | | 369/112.18 |
| 2010/0020291 | A1 * | 1/2010 | Kasazumi ............ | G02B 17/004 |
| | | | | 353/38 |

FOREIGN PATENT DOCUMENTS

| | | |
|---|---|---|
| JP | A-2007-58148 | 3/2007 |
| JP | A-2009-162984 | 7/2009 |
| JP | A-2010-204604 | 9/2010 |
| JP | A-2013-85159 | 5/2013 |

* cited by examiner

*Primary Examiner* — Sultan Chowdhury
(74) *Attorney, Agent, or Firm* — Oliff PLC

(57) ABSTRACT

A projector includes a light source device, a diffraction element that converts light from the light source device into 0-th order light and diffracted light, a light modulation device that modulates the diffracted light so as to form image light, and a projection optical system that emits projected light having a chief ray which is tilted with respect to an optical axis of the image light incident from the light modulation device. Defining a reference plane as a plane which is perpendicular to a plane including the optical axis and a chief ray of the projected light and includes the optical axis, a plane including an optical axis of the 0-th order light and a chief ray of the diffracted light intersects the reference plane.

9 Claims, 10 Drawing Sheets

PROJECTOR WITH TILT PROJECTION

BACKGROUND

1. Technical Field

The present invention relates to a projector.

2. Related Art

As for a projection method of a projector, tilt projection is known in which image light is projected obliquely upward onto a screen (refer to JP-A-2013-85159).

JP-A-2013-85159 discloses a method of correcting distortion of an image which is projected onto the screen when the tilt projection is performed.

On the other hand, there is a problem in that, when the tilt projection is performed, an upper part of the image projected onto the screen is darker than a lower part thereof, and thus uneven illuminance occurs in the image.

SUMMARY

An advantage of some aspects of the invention is to provide a projector capable of reducing illuminance unevenness of an image when tilt projection is performed.

An aspect of the invention is directed to a projector including a light source device; a diffraction element that converts light from the light source device into 0-th order light and diffracted light; a light modulation device that modulates the diffracted light so as to form image light; and a projection optical system that emits projected light having a chief ray which is tilted with respect to an optical axis of the image light incident from the light modulation device, in which, when a plane which is perpendicular to a plane including the optical axis and the chief ray of the projected light and includes the optical axis is defined as a reference plane, a plane including an optical axis of the 0-th order light and a chief ray of the diffracted light intersects the reference plane.

According to the projector of the aspect of the invention, a plane including an optical axis of 0-th order light (light which travels straight and passes through the diffraction element) emitted from the diffraction element and the chief ray of diffracted light intersects a reference plane. Here, the reference plane is perpendicular to a plane including the chief ray of projected light emitted from the projection optical system and an optical axis of image light incident on the projection optical system, and includes the optical axis of the image light. In other words, light incident on the diffraction element is diffracted, and at least some of the light is diffused in a direction (tilt direction) in which the image light is bent by the projection optical system. In addition, the diffraction element can be adjusted so that the intensity of the diffracted light varies depending on an angle with respect to the 0-th order light. For this reason, the diffraction element is adjusted so that light incident on the diffraction element is emitted as diffracted light having an intensity distribution for compensating illuminance unevenness which occurs due to tilt projection, and thus it is possible to reduce the illuminance unevenness which occurs due to the tilt projection. Therefore, according to the projector of the aspect of the invention, it is possible to provide the projector capable of reducing illuminance unevenness of an image when tilt projection is performed.

On the 0-th order light side, the diffracted light may include a region that has an intensity lower than the intensity of other regions, and the chief ray of the diffracted light may be tilted from the optical axis of the 0-th order light toward a side of the reference plane, the side being opposite to a side which includes the chief ray of the projected light.

In the tilt projection, illuminance on a side that corresponds to a tilt direction of the chief ray of the projected light with respect to the optical axis of image light coming from the light modulation device is reduced. According to this configuration, the chief ray of the diffracted light is tilted from an optical axis of the 0-th order light toward a side of the reference plane, the side not including the chief ray of the projected light. Furthermore, on the 0-th order light side, the diffracted light includes a region that has an intensity lower than the intensity of other regions. In other words, on a side in which the chief ray of the projected light is tilted with respect to the chief ray of the diffracted light, the diffracted light includes a region whose intensity is lower than the intensity of other regions. For this reason, according to the configuration, image light having a region whose intensity is higher than the intensity of other regions can be projected to a side in which illuminance is reduced due to the tilt projection, and thus reduced illuminance unevenness is provided.

On an opposite side to the 0-th order light side, the diffracted light may include a region that has an intensity lower than the intensity of other regions, and the chief ray of the diffracted light may be tilted from the optical axis of the 0-th order light toward a side of the reference plane, the side including the chief ray of the projected light.

According to this configuration, in the same manner as described above, image light having a region whose intensity is higher than the intensity of other regions can be projected to a side in which illuminance is reduced due to the tilt projection, and thus reduced illuminance unevenness is provided.

The intensity of the diffracted light may be reduced from a light beam whose angle with respect to the 0-th order light is the greatest toward a light beam whose angle with respect to the 0-th order light is the smallest on the plane including the optical axis of the 0-th order light and the chief ray of the diffracted light.

According to this configuration, the intensity of the diffracted light varies in a direction opposite to a direction in which illuminance in uneven illuminance occurring due to tilt projection varies. Therefore, according to this configuration, it is possible to effectively reduce the illuminance unevenness.

The projector may further include an optical path conversion element that converts an optical path of at least one of light incident on the diffraction element and the diffracted light so that an angle formed between an optical axis of the light source device and the reference plane is reduced.

According to this configuration, an angle formed between an optical axis of the light source device and the reference plane can be reduced, and thus it is possible to minimize an increase in the size of a projector.

The optical path conversion element may be provided on an optical path between the light source device and the diffracted element.

According to this configuration, since light which is not diffused by the diffraction element is incident on the optical path conversion element, it is possible to reduce a light-receiving surface of the optical path conversion element. Therefore, according to this configuration, it is possible to miniaturize an optical path conversion element.

The optical path conversion element may be a prism.

According to this configuration, it becomes easier to make light vertically incident on the diffraction element.

The light from the light source device may be vertically incident on an incidence surface of the diffraction element.

According to this configuration, it is possible to minimize a reduction in diffraction efficiency of the diffraction element, and, as a result, it is possible to improve light use efficiency.

The light source device may include a plurality of light sources, and the projector may further include a superimposing optical system that is provided on an optical path between the diffraction element and the light modulation device.

According to this configuration, light beams emitted from the plurality of light sources can be superimposed and be incident on the light modulation device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a projector according to embodiments of the invention will be described with reference to the drawings.

In addition, the scope of the invention is not limited to the following embodiments, and may be changed within the scope of the technical spirit of the invention. Further, in the following drawings, for better understanding of each constituent element, a scale, the number, or the like of each structure may be different from that of an actual structure.

First Embodiment

Figure 1:
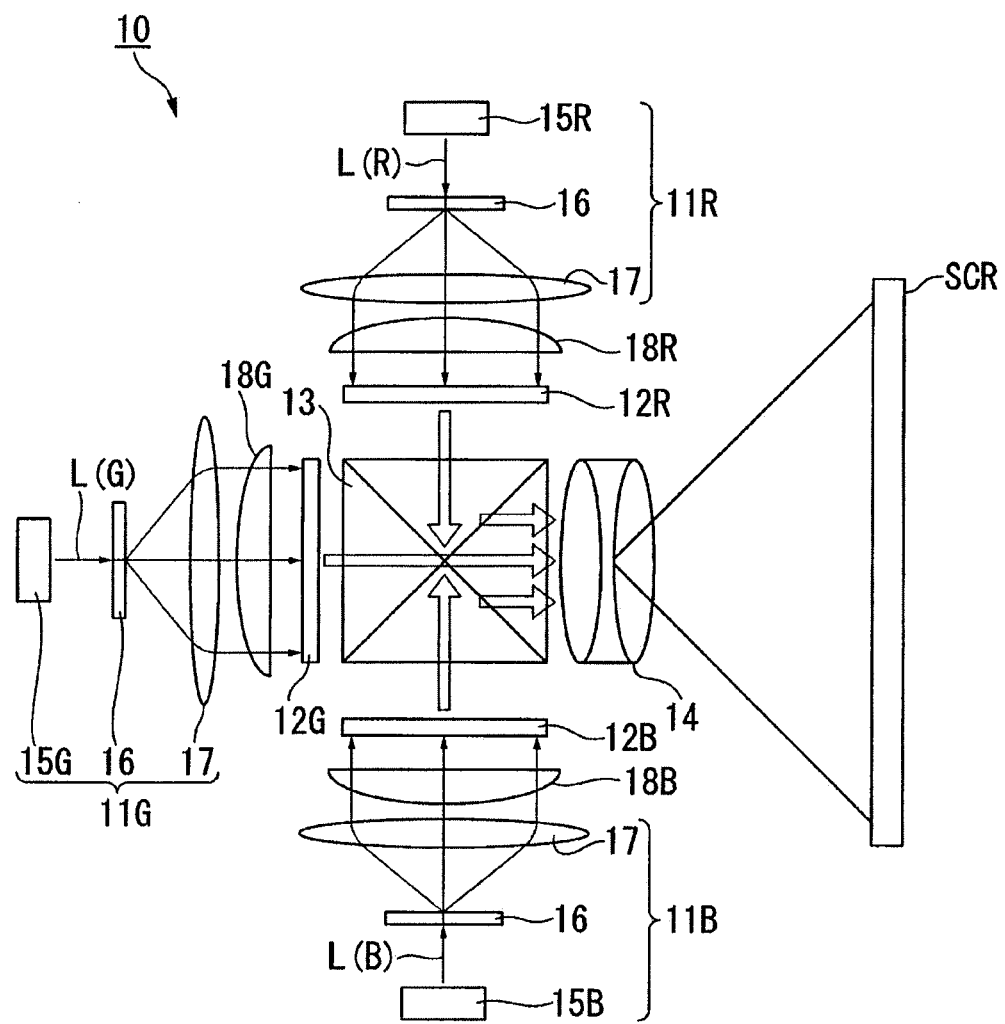
FIG. 1 is a schematic diagram illustrating a projector according to a first embodiment.
Figure 2:
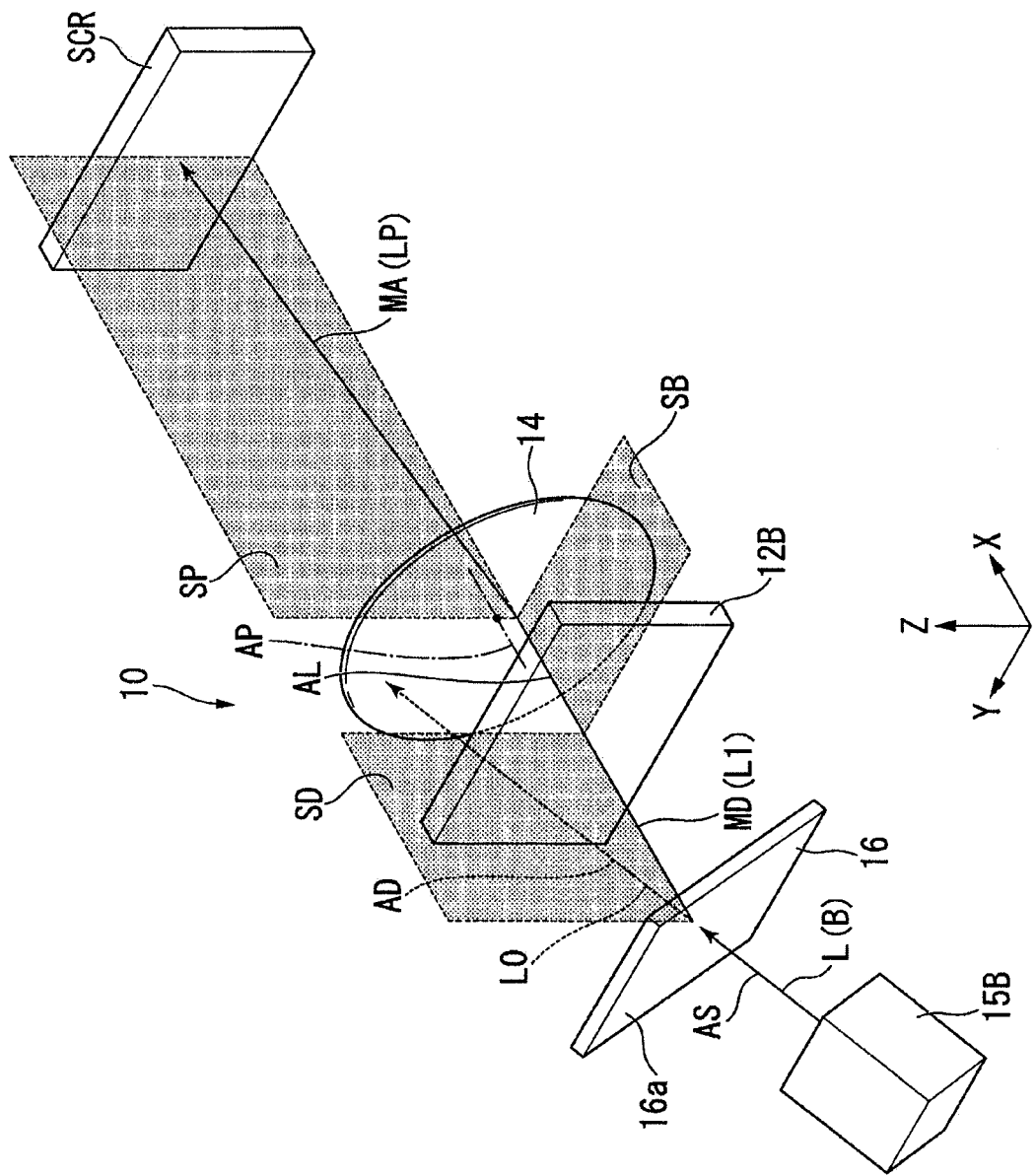
FIG. 2 is a perspective view schematically illustrating a partial configuration of the projector according to the first embodiment.
Figure 3:
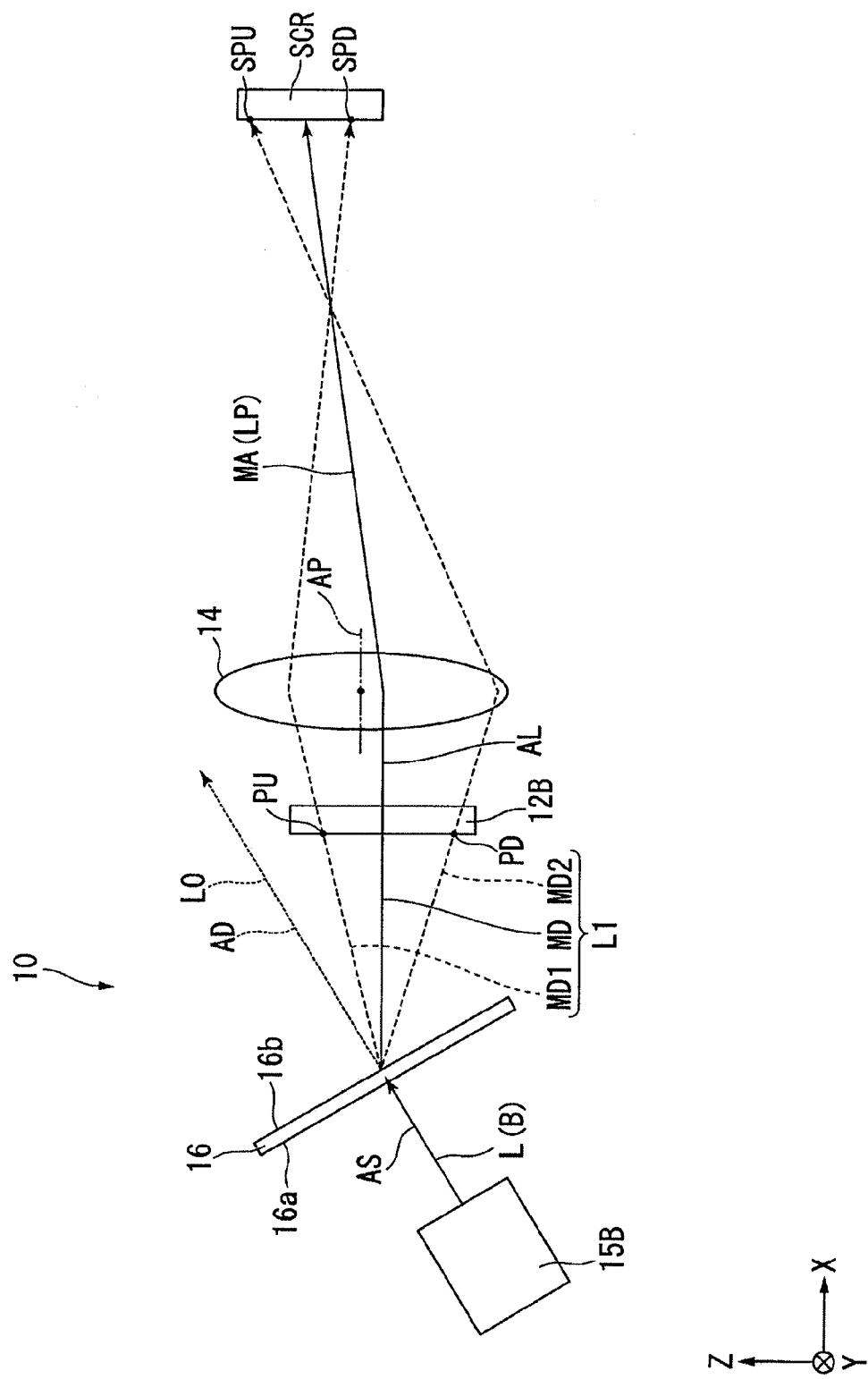
FIG. 3 is a side view schematically illustrating a partial configuration of the projector according to the first embodiment.

FIG. 1 is a schematic diagram illustrating a projector 10 of the present embodiment. FIG. 2 is a perspective view schematically illustrating a partial configuration of the projector 10. FIG. 3 is a side view schematically illustrating a partial configuration of the projector 10. In FIGS. 2 and 3, for description, some members are not illustrated as appropriate, and an arrangement relationship is also changed as appropriate.

In addition, in FIGS. 2 and 3, and FIGS. 4 and 6 to 10 described later, an XYZ coordinate system is set, and a positional relationship of each member is described with reference to the XYZ coordinate system. In this case, a vertical direction is set to a Z axis direction, a direction which is perpendicular to the Z axis direction and is also perpendicular to a surface of a light modulation device 12B (refer to FIG. 2) on which light is incident is set to an X axis direction, and a direction perpendicular to the X axis direction and the Z axis direction is set to a Y axis direction.

Further, in the following description, a direction (the X axis direction or the Y axis direction) perpendicular to the Z axis direction is referred to as a horizontal direction in some cases.

The projector 10 of the present embodiment includes, as illustrated in FIG. 1, an illumination device 11R, an illumination device 11G, an illumination device 11B, a field lens 18R, a field lens 18G, a field lens 18B, a light modulation device 12R, a light modulation device 12G, a light modulation device 12B, a cross dichroic prism 13, and a projection optical system 14.

In addition, the illumination device 11R, the illumination device 11G, and the illumination device 11B have the same configuration except that the colors of emitted light are different from each other, and, thus, in the following description, the illumination device 11B will be described as a representative thereof in some cases.

The illumination device 11B includes a light source unit 15B which emits blue (B) light, a diffraction element 16 on which blue light is incident from the light source unit 15B, and a superimposing optical system 17 on which diffracted light is incident from the diffraction element 16.

The light source unit 15B is provided with an array light source in which a plurality of semiconductor laser elements emitting, for example, blue (peak of emission intensity: around 460 nm) laser light are arranged. The light source unit 15B is not limited to a configuration in which a semiconductor laser element is used as a light source, and may be a light source unit which uses an LED or a lamp as a light source. In the present embodiment, the light source unit 15B is disposed so as to emit light L obliquely upward as illustrated in FIGS. 2 and 3. An angle between the light L emitted by the light source unit 15B and the diffraction element is set so that light (0-th order light L0 described later) which passes through the diffraction element 16 and travels straight is deviated from an optical path of illumination light. The light L emitted from the light source unit 15B is incident on the diffraction element 16 from an incidence surface 16a as illustrated in FIG. 2.

The diffraction element 16 is disposed in a posture tilted with respect to the vertical direction (Z axis direction) so that the incidence surface 16a is perpendicular to the light L emitted from the light source unit 15B.

The diffraction element 16 is a computer generated hologram (hereinafter, referred to as a CGH) in which a concave-and-convex structure designed by a computer is formed. The CGH is a wavefront conversion element which converts a wavefront of incident light by using a diffraction phenomenon. Particularly, a phase modulation type CGH can perform wavefront conversion without losing nearly any energy of the incident light waves. As mentioned above, the CGH can generate a uniform intensity distribution or an intensity distribution with a simple shape depending on its design.

In the present embodiment, as illustrated in FIG. 3, the diffraction element 16 converts the light L incident on the diffraction element 16 into first order diffracted light L1 and 0-th order light L0. A chief ray MD of the first order diffracted light L1 is tilted downward (−Z side) with respect to the 0-th order light L0. In other words, the chief ray MD of the first order diffracted light L1 is tilted from an optical axis AD of the 0-th order light L0 toward a side (−Z side) of a reference plane SB, which will be described later, the side not including a chief ray MA of projected light LP which is emitted from the projection optical system 14.

In the present embodiment, the diffraction element 16 is designed and disposed so that a direction of the chief ray MD of the first order diffracted light L1 emitted from an emission surface 16b is parallel (parallel to the X axis direction), depending on an arrangement angle of the light source unit 15B, that is, a relationship with a direction of the light L emitted from the light source unit 15B. The first order diffracted light L1 emitted from the diffraction element 16 is incident on the superimposing optical system 17 as illustrated in FIG. 1. On the other hand, the 0-th order light L0 is light obtained as a result of the light L emitted from the light source unit 15B traveling straight and passing through the diffraction element 16, and is thus deviated from the optical path due to the above-described angle arrangement of the light source unit 15B.

In the present embodiment, as illustrated in FIGS. 2 and 3, on a plane SD including the optical axis AD of the 0-th order light L0 and the chief ray MD of the first order diffracted light L1, the intensity of the first order diffracted light L1 emitted from the diffraction element 16 is set to be lower as an angle of a light beam with respect to the 0-th order light L0 is smaller. In other words, on the plane SD, the intensity of the first order diffracted light L1 is reduced from a light beam MD2 whose angle with respect to the 0-th order light L0 is the greatest toward a light beam MD1 whose angle with respect to the 0-th order light L0 is the smallest. In other words, on the 0-th order light L0 side, the first order diffracted light L1 includes a region (light beam MD1) that has an intensity smaller than the intensity of other regions.

The superimposing optical system 17 includes at least one superimposing lens as illustrated in FIG. 1. The first order diffracted light L1 incident on the superimposing optical system 17 is emitted to the light modulation device 12B via the field lens 18B, and is superimposed in the light modulation device 12B.

The illumination device 11R includes a light source unit 15R which emits red (R) light, a diffraction element 16 on which red light is incident from the light source unit 15R, and a superimposing optical system 17 on which diffracted light is incident from the diffraction element 16.

The red light emitted from the illumination device 11R is incident on the light modulation device 12R in the same manner as the blue light emitted from the illumination device 11B.

The illumination device 11G includes a light source unit 15G which emits green (G) light, a diffraction element 16 on which green light is incident from the light source unit 15G, and a superimposing optical system 17 on which diffracted light is incident from the diffraction element 16.

The green light emitted from the illumination device 11G is incident on the light modulation device 12G in the same manner as the blue light emitted from the illumination device 11B.

The light modulation device 12R, the light modulation device 12G, and the light modulation device 12B modulate incident color light according to image information so as to form image light, and are illumination targets of the illumination device 11R, the illumination device 11G, and the illumination device 11B. The light modulation device 12R, the light modulation device 12G, and the light modulation device 12B respectively modulate incident color light beams.

The light modulation device 12R, the light modulation device 12G, and the light modulation device 12B may employ well-known devices, and are constituted by light modulation devices such as transmissive liquid crystal light valves which include, for example, a liquid crystal element and two polarization elements with the liquid crystal element interposed therebetween. The two polarization elements have a configuration (cross Nicol arrangement) in which, for example, transmission axes are perpendicular to each other.

For example, each of the light modulation device 12R, the light modulation device 12G, and the light modulation device 12B is a transmissive light modulation device in which liquid crystal is sealed between a pair of transparent substrates, and modulates a polarization direction of one kind of linearly polarized light emitted from an incidence side polarization element according to given image information, with a polysilicon TFT as a switching element.

The image light beams modulated by the light modulation device 12R, the light modulation device 12G, and the light modulation device 12B are incident on the cross dichroic prism 13.

The cross dichroic prism 13 is an optical element which combines image light beams modulated for the respective incident color light beams with each other so as to form a color image. The cross dichroic prism 13 has a substantially square shape in a plan view, in which four right-angle prisms are joined together. A dielectric multilayer film is formed on approximately X-shaped interfaces by which the right-angle prisms are joined together. The dielectric multilayer film formed on one of the approximately X-shaped interfaces reflects red light, and the dielectric multilayer film formed on the other interface reflects blue light. The red light and the blue light are bent by the dielectric multilayer film so that a traveling direction of the red light and a traveling direction of the blue light are aligned with a traveling direction of green light, and thus the three color light beams are combined with each other.

Image light emitted from the cross dichroic prism 13 is incident on the projection optical system 14.

The projection optical system 14 includes at least one projection lens. The projection optical system 14 is disposed as illustrated in FIGS. 2 and 3 so that an optical axis AP is located further upward (+Z side) than an optical axis AL of the incident image light. Accordingly, the light incident on the projection optical system 14 is projected obliquely upward (tilt projection). In other words, a direction of the chief ray MA of the projected light LP emitted from the projection optical system 14 is tilted obliquely upward with respect to the optical axis AL of the image light incident on the projection optical system 14.

Here, as illustrated in FIG. 2, a plane which is perpendicular to a plane SP including the optical axis AL of the image light and the chief ray MA of the projected light LP emitted from the projection optical system 14 and includes the optical axis AL is set to a reference plane SB. A relationship between a direction in which the projected light LP emitted from the projection optical system 14 is tilted and a direction in which the light L emitted from the light source unit 15B is diffracted by the diffraction element 16 results in a relationship in which the plane SD is perpendicular to the reference plane SB.

The image light (projected light LP) emitted from the projection optical system 14 is enlarged and projected so as to form an image on a screen SCR.

According to the present embodiment, the plane SD including the optical axis AD of the 0-th order light L0 and the chief ray MD of the first order diffracted light L1 is provided so as to intersect the reference plane SB, and thus it is possible to reduce illuminance unevenness of an image which occurs in tilt projection. Hereinafter, details thereof will be described through comparative examples.

Figure 4:
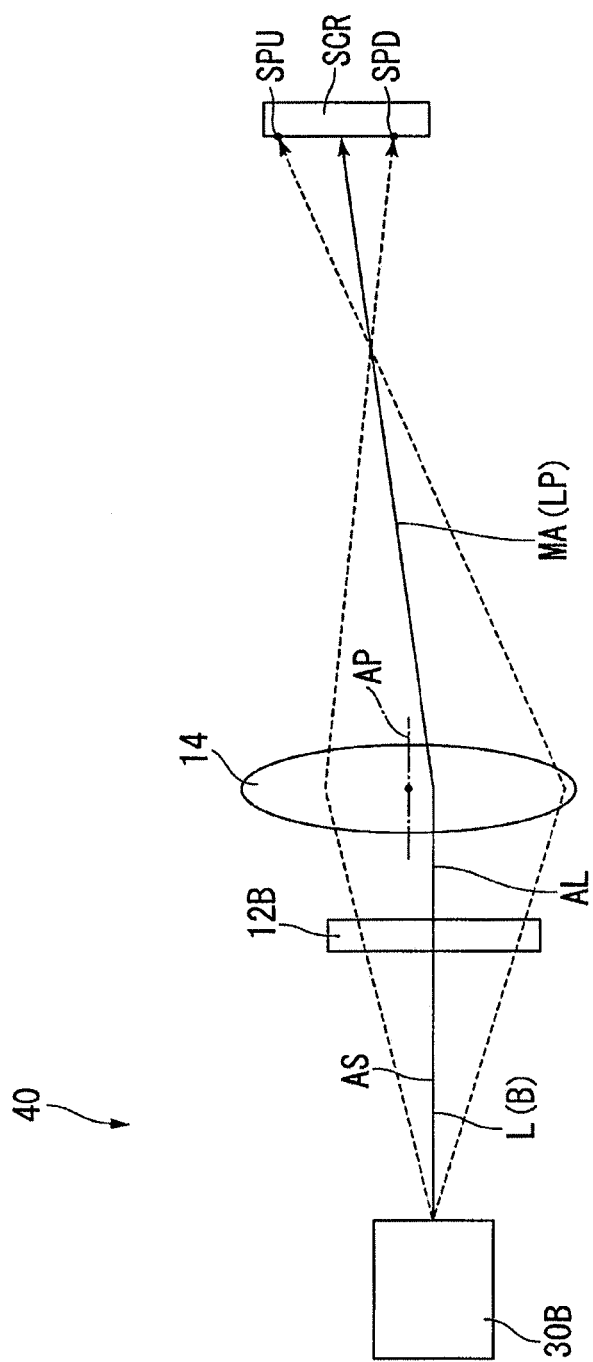
FIG. 4 is a side view schematically illustrating a partial configuration of a projector of a comparative example.

FIG. 4 is a side view schematically illustrating a partial configuration of a projector 40 of a comparative example.

In addition, the same constituent elements as those of the projector 10 of the present embodiment are given the same reference numerals, and description thereof will be omitted in some cases.

The projector 40 of the comparative example includes, as illustrated in FIG. 4, a light source unit 30B, a light modulation device 12B, and a projection optical system 14.

Light emitted from the light source unit 30B is incident on the light modulation device 12B. The light incident on the light modulation device 12B is modulated so as to be emitted as image light. In addition, the image light is incident on the projection optical system 14 which is disposed so as to perform tilt projection in the same manner as in the projector 10, and is tilt-projected onto the screen SCR.

Here, in a case where the tilt projection is performed while the light modulation device 12B is uniformly illuminated, uneven illuminance occurs in an image projected onto the screen. In a case of the comparative example illustrated in FIG. 4, the projection optical system 14 is disposed obliquely upward (+Z direction), and thus illuminance of an image is reduced from a lower end SPD of a part where the image is projected toward an upper end SPU on the screen SCR. In other words, uneven illuminance occurs in the vertical direction (Z axis direction).

In contrast, according to the projector 10 of the present embodiment, the intensity of the first order diffracted light L1 diffracted by the diffraction element 16 is set to be reduced from the light beam MD2 whose angle with respect to the 0-th order light L0 is the greatest toward the light beam MD1 whose angle with respect to the 0-th order light L0 is the smallest. In other words, on the 0-th order light L0 side, the first order diffracted light L1 includes a region that has an intensity smaller than the intensity of other regions. In addition, a diffraction direction of the light L by the diffraction element 16 with respect to a tilt direction of the projected light LP emitted by the projection optical system 14 is set such that the relationship in which the plane SD is perpendicular to the reference plane SB is satisfied. Accordingly, the intensity of light applied to the light modulation device 12B is reduced from a lower end PD toward an upper end PU of a region illuminated with the light in the light modulation device 12B.

In addition, in the present embodiment, since the projection optical system 14 is disposed so as to be deviated upward (+Z direction), in a case where the diffraction element 16 is not provided, the illuminance of an image projected onto the screen SCR is reduced from the lower end SPD toward the upper end SPU in the same manner as in the above-described comparative example.

Further, the image light emitted from the light modulation device 12B is reversed upside down and is then projected onto the screen SCR by the projection optical system 14.

From the above description, in the present embodiment, a direction (Z axis direction) in which uneven illuminance occurs and a direction (Z axis direction) in which the intensity of image light projected onto the screen SCR is distributed are set to match each other, and intensity variation tendencies are opposite to each other. Therefore, image light with high intensity is projected onto the upper part of the screen SCR in which illuminance is reduced due to tilt projection, and image light with intensity lower than that of the light projected onto the upper part of the screen SCR is projected onto the lower part in which an illuminance reduction is smaller than that of the upper part of the screen SCR. Therefore, according to the present embodiment, it is possible to provide the projector capable of reducing illuminance unevenness of an image projected onto the screen SCR.

In addition, in the projector having a configuration in which light from the laser light source is diffracted by the diffraction element, there is a problem in that, when 0-th order light is incident on the light modulation device, a part on which the 0-th order light is incident becomes a bright spot, and thus image quality deteriorates. In contrast, according to the present embodiment, the 0-th order light L0 is deviated from the optical path and is not incident on the light modulation device 12B, and thus it is possible to improve image quality.

In addition, the present embodiment may employ the following configurations.

In the above-described present embodiment, the diffraction element 16 is designed so that, on the plane SD, the intensity of the first order diffracted light L1 is reduced from the light beam MD2 whose angle with respect to the 0-th order light L0 is the greatest toward the light beam MD1 whose angle with respect to the 0-th order light L0 is the smallest, but is not limited thereto. In the present embodiment, for example, the diffraction element 16 may be designed so that, on the plane SD, the intensity of the first order diffracted light L1 is increased from the light beam MD2 whose angle with respect to the 0-th order light L0 is the greatest toward the light beam MD1 whose angle with respect to the 0-th order light L0 is the smallest. In other words, on an opposite side to the 0-th order light L0 side, the first order diffracted light L1 includes a region that has an intensity lower than the intensity of other regions. In this case, the projection optical system 14 is provided so that the optical axis AP is located further downward (−Z side) than the optical axis AL of incident image light. That is, the image light is projected obliquely downward by the projection optical system 14. In other words, the chief ray MD of the first order diffracted light L1 is set to be tilted from the optical axis AD of the 0-th order light L0 toward a side (−Z side) of the reference plane SB, the side including the chief ray MA of the projected light LP emitted from the projection optical system 14.

In addition, in the above-described present embodiment, the plane SD is perpendicular to the reference plane SB, but is not limited thereto. In the present embodiment, an angle between the plane SD and the reference plane SB is not particularly limited to a range in which the plane SD intersects the reference plane SB.

Further, in the present embodiment, the intensity of the first order diffracted light L1 may not be distributed so as to continuously vary. In the present embodiment, for example, the intensity of the first order diffracted light L1 on the 0-th order light L0 side may be higher than the intensity on an opposite side to the 0-th order light L0, so that the intensity thereof varies in two stages.

Second Embodiment

The present embodiment is different from the first embodiment in that an optical path conversion element 20 is provided.

In addition, the same constituent elements as those of the above-described embodiment are given the same reference numerals, and description thereof will be omitted in some cases.

Figure 5:
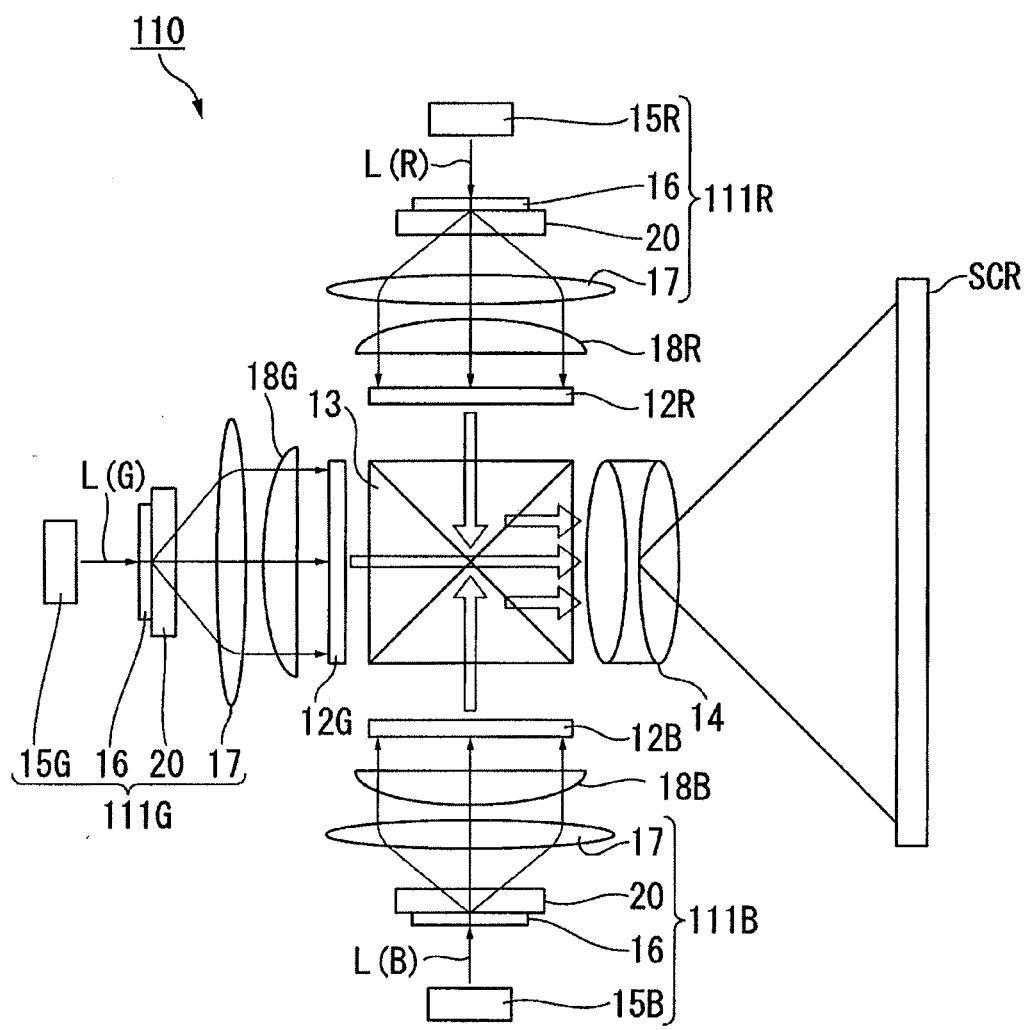
FIG. 5 is a schematic diagram illustrating a projector according to a second embodiment.
Figure 6:
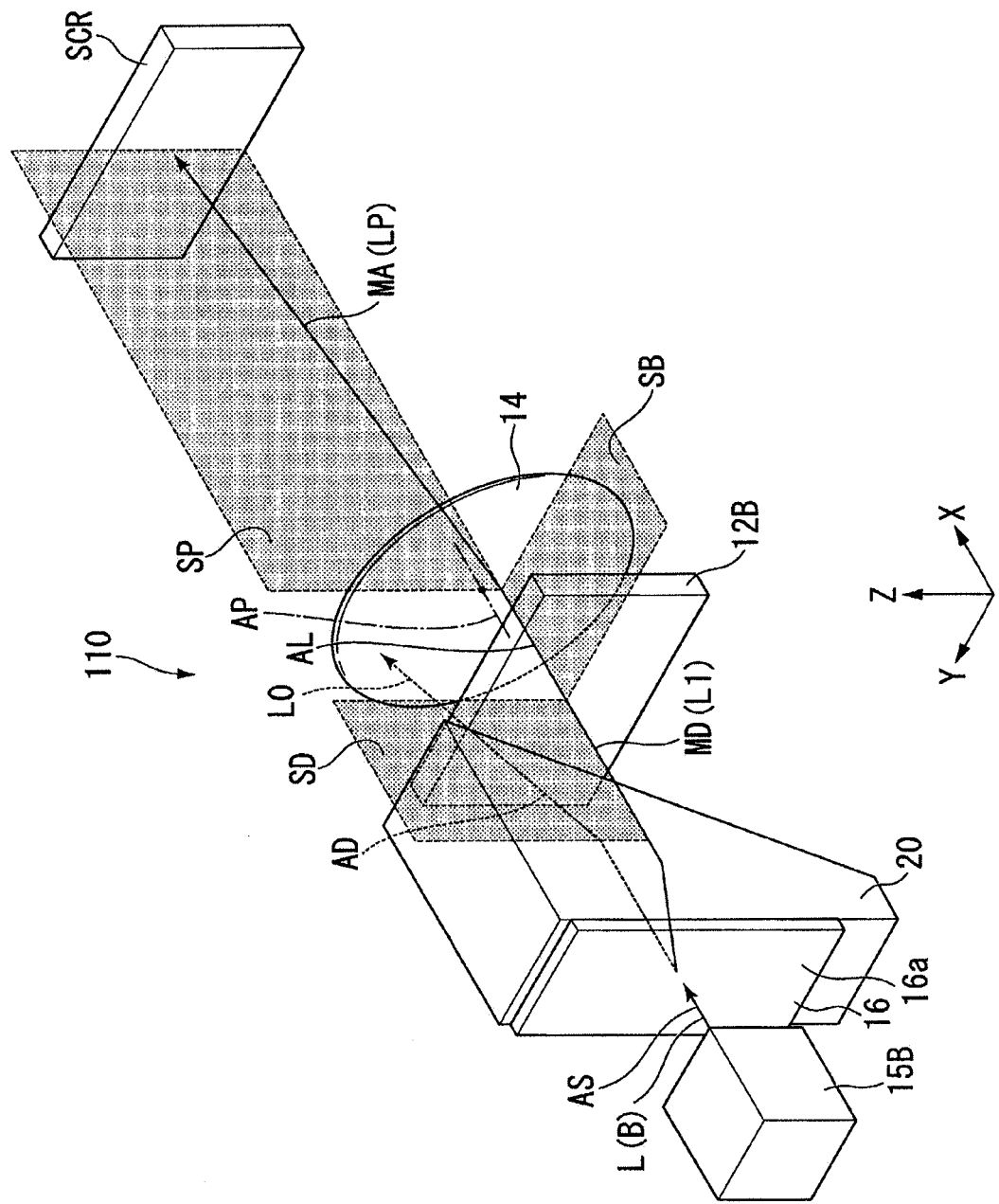
FIG. 6 is a perspective view schematically illustrating a partial configuration of the projector according to the second embodiment.
Figure 7:
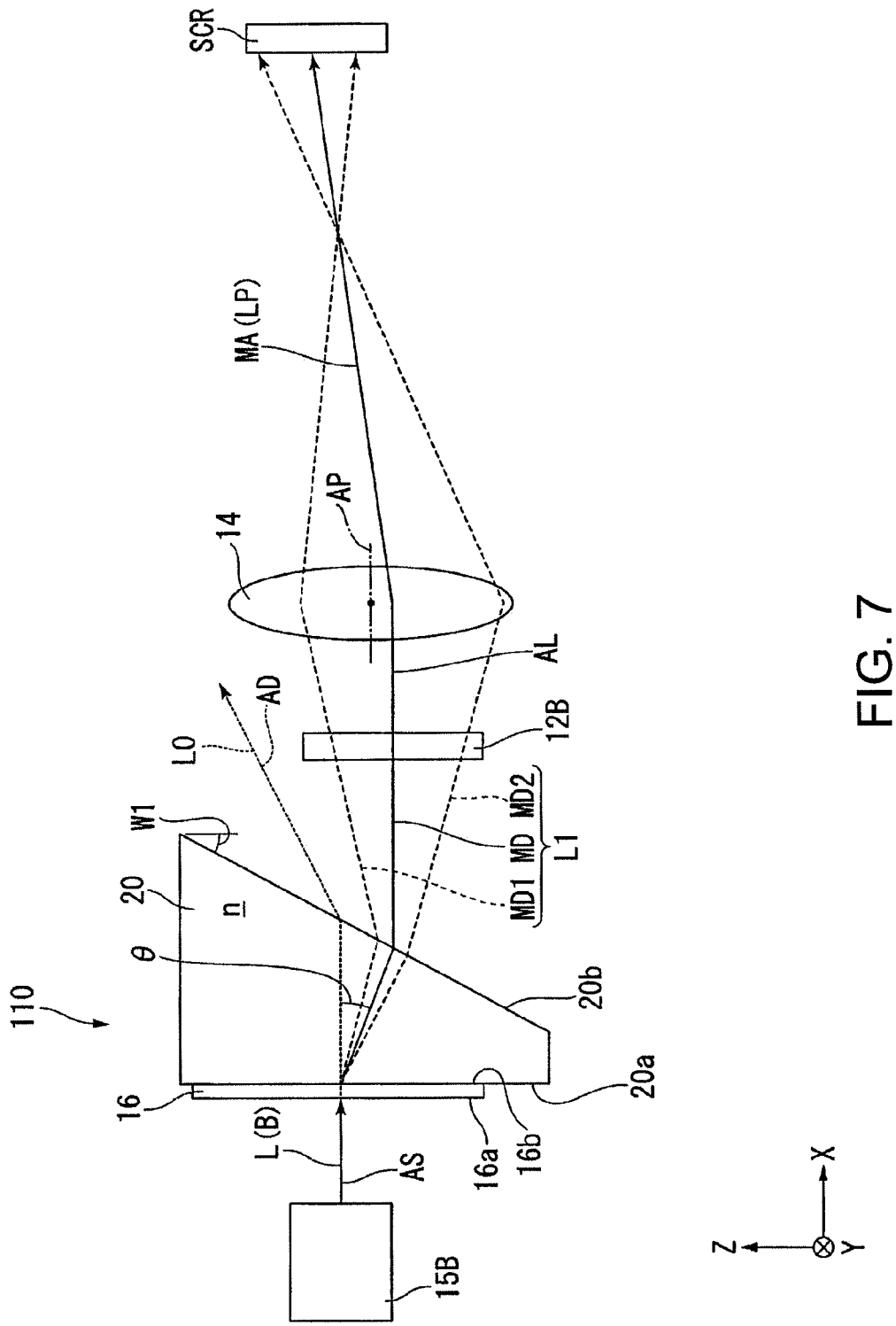
FIG. 7 is a side view schematically illustrating a partial configuration of the projector according to the second embodiment.

FIG. 5 is a schematic diagram illustrating a projector 110 of the present embodiment. FIG. 6 is a perspective view schematically illustrating a partial configuration of the projector 110. FIG. 7 is a side view schematically illustrating a partial configuration of the projector 110. In FIGS. 6 and 7, for description, members are not illustrated as appropriate, and an arrangement relationship is also changed as appropriate.

The projector 110 of the present embodiment includes, as illustrated in FIG. 5, an illumination device 111R, an illumination device 111G, an illumination device 111B, a field lens 18R, a field lens 18G, a field lens 18B, a light modulation device 12R, a light modulation device 12G, a light modulation device 12B, a cross dichroic prism 13, and a projection optical system 14.

The illumination device 111B includes a light source unit 15B which emits blue (B) light, a diffraction element 16 on which blue light is incident from the light source unit 15B, an optical path conversion element 20, and a superimposing optical system 17 on which diffracted light is incident from the diffraction element 16. The illumination device 111R is the same as the illumination device 111B except that a light source unit 15R emitting red (R) light is provided. The illumination device 111G is the same as the illumination device 111B except that a light source unit 15G emitting green (R) light is provided.

In addition, the illumination device 111R, the illumination device 111G, and the illumination device 111B have the same configuration except that colors of emitted light are different from each other, and, thus, in the following description, the illumination device 111B will be described as a representative thereof in some cases.

As illustrated in FIGS. 6 and 7, in the present embodiment, the light source unit 15B is disposed so as to emit light L in a horizontal direction (parallel to the X axis direction). The diffraction element 16 is disposed so that the light L emitted from the light source unit 15B is vertically incident on the incidence surface 16a of the diffraction element 16. The optical path conversion element 20 is provided on the emission surface 16b of the diffraction element 16.

The optical path conversion element 20 is provided on the optical path between the diffraction element 16 and the light modulation device 12B. The optical path conversion element 20 is, for example, a trapezoidal prism in a side view in the present embodiment. In the optical path conversion element 20, an incidence surface 20a on which light is incident is provided so as to be in contact with the emission surface 16b of the diffraction element 16. The incidence surface 20a of the optical path conversion element 20 is perpendicular to the 0-th order light L0 emitted from the diffraction element 16.

The 0-th order light L0 and the first order diffracted light L1 which are incident on the optical path conversion element 20 from the diffraction element 16 are emitted from an emission surface 20b of the optical path conversion element 20. The emission surface 20b is provided obliquely to a direction (X axis direction) of the light L emitted from the light source unit 15B. An angle W1 of the emission surface 20b is set so that the chief ray MD of the first order diffracted light L1 emitted from the emission surface 20b is horizontal (parallel to the X axis direction). More specifically, when an angle of the chief ray MD of the first order diffracted light L1 with respect to the 0-th order light L0 is an angle $\theta$, and a refractive index of the optical path conversion element 20 is a refractive index n, the angle W1 is set to be W1=$\theta$+a tan (sin $\theta$/(n-cos $\theta$)).

As mentioned above, the optical path conversion element 20 converts an optical path of the incident first order diffracted light L1 into a horizontal direction (X axis direction). In other words, the optical path conversion element 20 converts an optical path of the first order diffracted light L1 so that an angle formed between the optical axis AS of the light source unit 15B and the reference plane SB is reduced.

Among light beams emitted from the optical path conversion element 20, the 0-th order light L0 is refracted at the emission surface 20b and is thus deviated from the optical path, and the first order diffracted light L1 is incident on the light modulation device 12B via the superimposing optical system 17 and the field lens 18B as illustrated in FIG. 5. In addition, image light modulated by the light modulation device 12B is tilt-projected onto the screen SCR via the cross dichroic prism 13 and the projection optical system 14 in the same manner as in the first embodiment.

According to the present embodiment, the optical path conversion element 20 converts an optical path of light emitted from the diffraction element 16, and thus a direction of the first order diffracted light L1 which is incident on the light modulation device 12B can be made horizontal. In other words, both a direction of the first order diffracted light L1 and a direction of the light L emitted from the light source unit 15B can be made parallel to the horizontal plane (XY plane). For this reason, according to the present embodiment, the light source unit 15B can be horizontally disposed. Accordingly, according to the present embodiment, an increase in a size of the projector 110 in the vertical direction (Z axis direction) is minimized. In addition, according to the present embodiment, each member is horizontally or vertically installed, and thus it also becomes easier to manufacture a member for fixation of each member.

Further, in the present embodiment, since the light source unit 15B includes an array light source, a plurality of light beams L are emitted from the light source unit 15B, and a plurality of first order diffracted light beams L1 are emitted from the diffraction element 16. Here, if the plurality of first order diffracted light beams L1 are refracted at different angles by the optical path conversion element 20, incidence angles of the chief rays MD of the first order diffracted light beams L1 which are incident on the superimposing optical system 17 are different from each other, and thus it may be difficult to superimpose the light beams. According to the present embodiment, since the prism is used as the optical path conversion element 20, refraction directions of the plurality of first order diffracted light beams L1 can be aligned with each other, and thus the plurality of first order diffracted light beams L1 are easily made incident on the superimposing optical system 17 at the same angle. As a result, according to the present embodiment, the superimposing optical system 17 easily superimposes the light beams.

In addition, the present embodiment may employ the following configurations.

Figure 8:
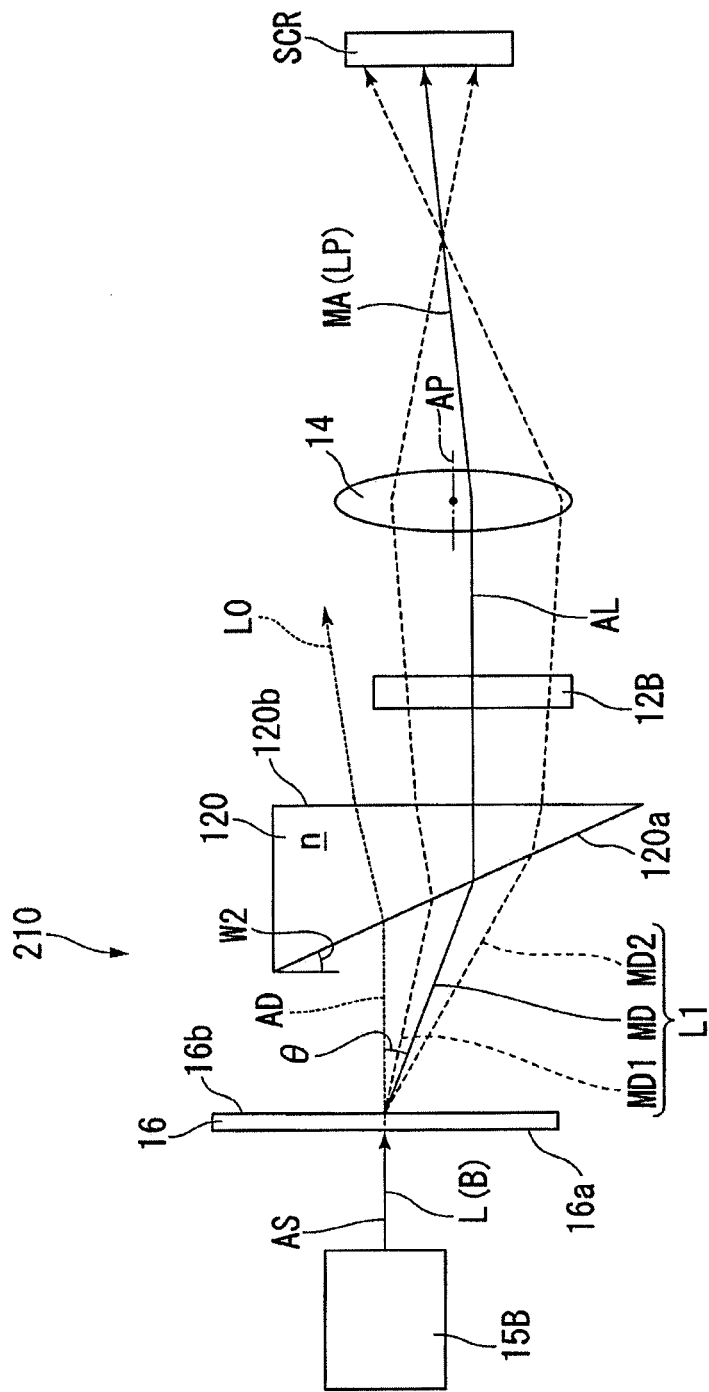
FIG. 8 is a side view schematically illustrating another example of the projector according to the second embodiment.
Figure 9:
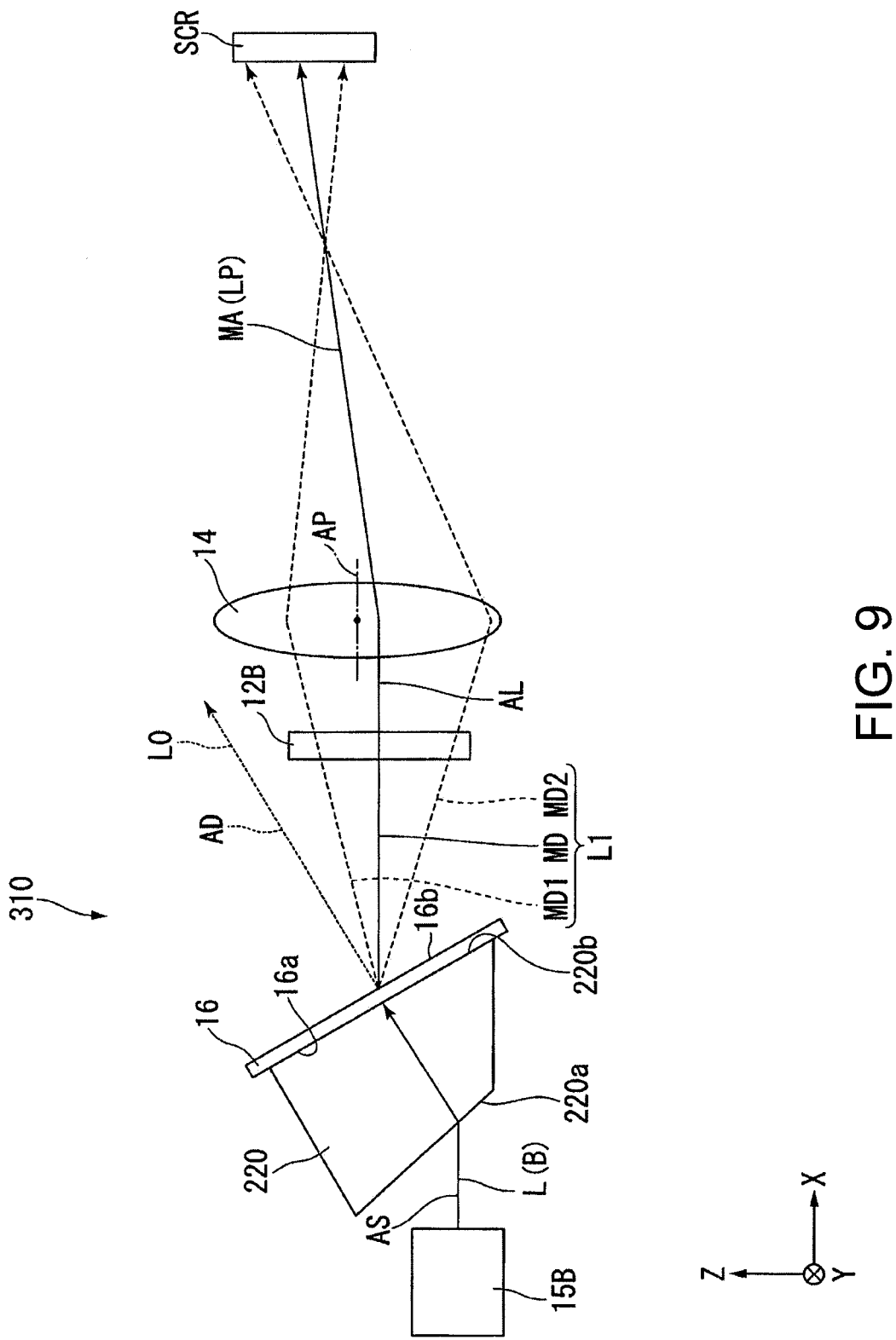
FIG. 9 is a side view schematically illustrating still another example of the projector according to the second embodiment.
Figure 10:
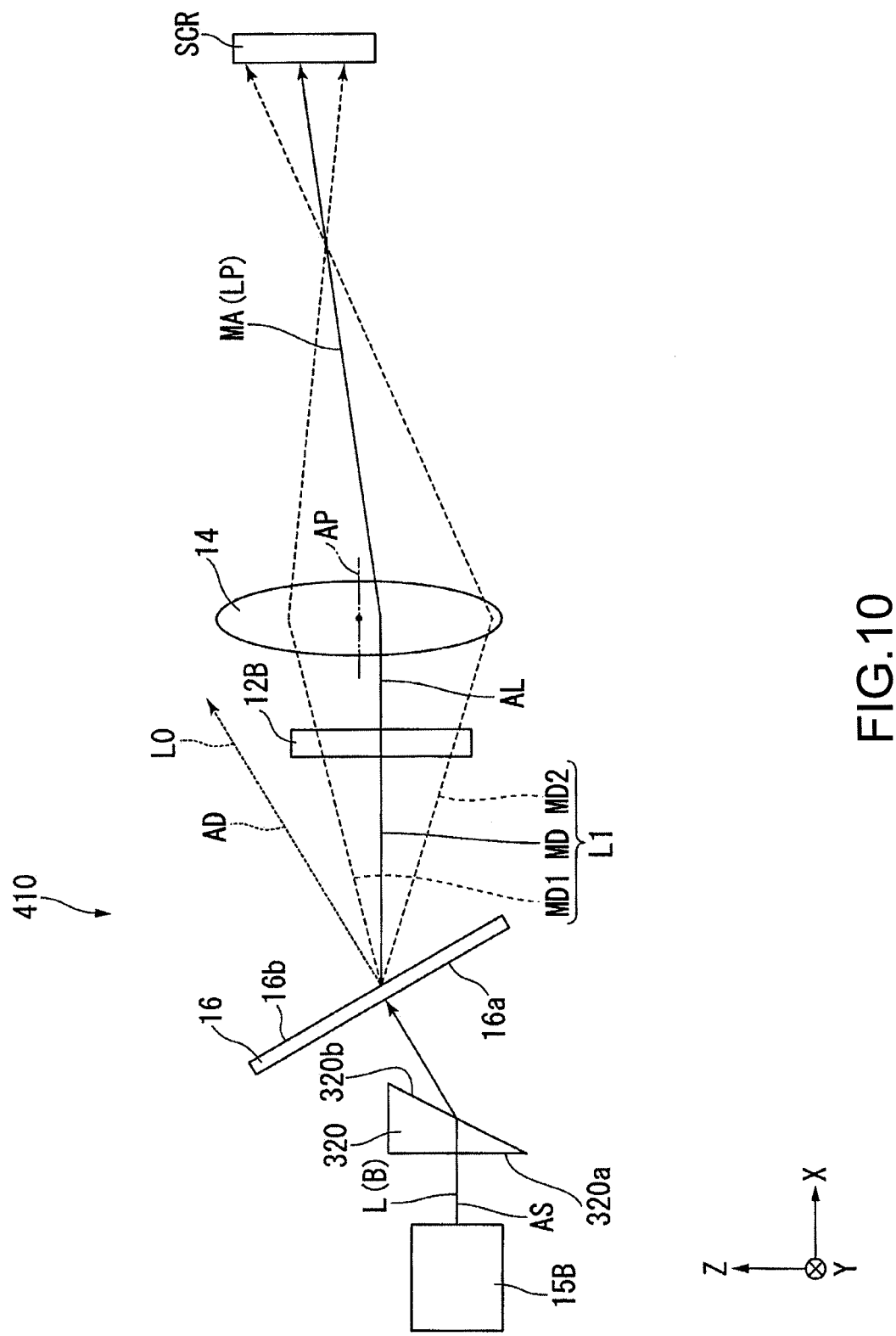
FIG. 10 is a side view schematically illustrating still another example of the projector according to the second embodiment.

In the above description, the optical path conversion element 20 is provided on the optical path between the diffraction element 16 and the light modulation device 123, and the optical path conversion element 20 is in contact with the diffraction element 16, but the present embodiment is not limited thereto. The present embodiment may employ configurations as illustrated in FIGS. 8 to 10. Hereinafter, the configurations will be described in order.

FIG. 8 is a side view schematically illustrating a partial configuration of a projector 210 as another example of the present embodiment.

The projector 210 is different from the above-described projector 110 in that an optical path conversion element 120 is provided so as to be separated from the diffraction element 16.

The optical path conversion element 120 is a triangular prism in a side view (in a ZX plane view) as illustrated in FIG. 8. The optical path conversion element 120 is provided so as to be separated from the diffraction element 16 on the optical path between the diffraction element 16 and the light modulation device 12B. The optical path conversion element 120 includes an incidence surface 120a on which diffracted light from the diffraction element 16 is incident, and an emission surface 120b from which the light incident on the incidence surface 120a is emitted. The incidence surface 120a is provided obliquely to a direction of light L emitted from the light source unit 15B so that the incident first order diffracted light L1 is refracted in the horizontal direction (X axis direction). An angle W2 of the incidence surface 120a is obtained from W2=a tan (sin θ/(n-cos θ)).

The emission surface 120b of the optical path conversion element 120 is provided so as to be perpendicular to the chief ray MD of the first order diffracted light L1 which is refracted by the incidence surface 120a. Accordingly, the first order diffracted light L1 is emitted from the optical path conversion element 120 in a state in which the chief ray MD thereof is horizontal (parallel to the X axis direction).

According to this configuration, since the optical path conversion element 120 is provided so as to be separated from the diffraction element 16, it becomes easier to exchange the optical path conversion element 120 or to adjust an arrangement angle of the optical path conversion element 120.

FIG. 9 is a side view schematically illustrating a partial configuration of a projector 310 as still another example of the present embodiment.

The projector 310 is different from the above-described projector 110 in that an optical path conversion element 220 is provided on an optical path between the light source unit 15B and the diffraction element 16. In addition, in the projector 310, the diffraction element 16 is disposed in the same manner as in the projector 10 of the first embodiment.

The optical path conversion element 220 is a rectangular prism in a side view (in a ZX plane view) as illustrated in FIG. 9. Both an incidence surface 220a and an emission surface 220b of the optical path conversion element 220 are provided obliquely to the direction of light L emitted from the light source unit 15B. The emission surface 220b is provided so as to be in contact with the incidence surface 16a of the diffraction element 16.

The optical path conversion element 220 refracts the light L, which is emitted in the horizontal direction (X axis direction) from the light source unit 15B, obliquely upward. In other words, the optical path conversion element 220 converts an optical path of the light L incident on the diffraction element 16 so that an angle formed between the optical axis AS (refer to FIG. 6) of the light source unit 15B and the reference plane SB is reduced.

A refraction angle at the incidence surface 220a of the optical path conversion element 220 is set to an angle which causes the refracted light to be vertically incident on the incidence surface 16a of the diffraction element 16.

Accordingly, both a direction of the light L emitted from the light source unit 15B and a direction of the chief ray MD of the first order diffracted light L1 emitted from the diffraction element 16 are parallel to the horizontal plane (XY plane).

According to this configuration, since the optical path conversion element 220 is provided on the optical path between the light source unit 15B and the diffraction element 16, light which is not diffused by the diffraction element 16 is incident on the incidence surface 220a of the optical path conversion element 220. For this reason, according to the configuration, it is possible to reduce a size of the incidence surface 220a and thus to miniaturize the optical path conversion element 220.

In addition, according to the configuration, since the prism is used as the optical path conversion element 220, it is possible to reduce aberration of light as compared with a case where, for example, a lens is used as the optical path conversion element 220, and thus the light L from the light source unit 15B is easily vertically incident on the diffraction element 16 with high accuracy.

FIG. 10 is a side view schematically illustrating a partial configuration of a projector 410 as still another example of the present embodiment.

The projector 410 is different from the above-described projector 310 in that an optical path conversion element 320 is provided so as to be separated from the diffraction element 16.

The optical path conversion element 320 is a triangular prism in a side view (in a ZX plane view) as illustrated in FIG. 10. The optical path conversion element 320 is provided so as to be separated from the diffraction element 16 on the optical path between the light source unit 15B and the diffraction element 16. An incidence surface 320a of the optical path conversion element 320 is provided so that light L emitted from the light source unit 15B is vertically incident thereon. An emission surface 320b of the optical path conversion element 320 is provided obliquely to the light L emitted from the light source unit 15B. An angle of the emission surface 320b is set so that the light L refracted and emitted from the emission surface 320b of the optical path conversion element 320 is vertically incident on the incidence surface 16a of the diffraction element 16. Accordingly, both a direction of the light L emitted from the light source unit 15B and a direction of the chief ray MD of the first order diffracted light L1 emitted from the diffraction element 16 are parallel to the horizontal plane (XY plane).

According to this configuration, since the optical path conversion element 320 is provided so as to be separated from the diffraction element 16, it becomes easier to exchange the optical path conversion element 320 or to adjust an arrangement angle of the optical path conversion element 320.

In addition, in the above description, although the Z axis direction is set as a vertical direction, and the X axis direction and the Y axis direction are set as a horizontal direction, the present embodiment is not limited thereto. The X axis direction or the Y axis direction may be a vertical direction, and directions other than the X axis direction, the Y axis direction, and the Z axis direction may be a vertical direction.

The entire disclosure of Japanese Patent Application No. 2013-182061, filed on Sep. 3, 2013 is expressly incorporated by reference herein.

What is claimed is:

1. A projector comprising:
   a light source device;
   a diffraction element that converts light from the light source device into 0-th order light and diffracted light;
   a light modulation device that modulates the diffracted light so as to form image light; and
   a projection optical system that emits projected light having a chief ray which is tilted with respect to an optical axis of the image light incident from the light modulation device,
   wherein, when a plane which is perpendicular to a plane including the optical axis and the chief ray of the projected light and includes the optical axis is defined as a reference plane, a plane including an optical axis of the 0-th order light and a chief ray of the diffracted light intersects the reference plane.

2. The projector according to claim 1,
   wherein the diffracted light includes a region on the 0-th order light side, the region having an intensity lower than the intensity of other regions, and
   wherein the chief ray of the diffracted light is tilted from the optical axis of the 0-th order light toward a side of the reference plane, the side being opposite to a side which includes the chief ray of the projected light.

3. The projector according to claim 1,
   wherein the diffracted light includes a region on an opposite side to the 0-th order light side, the region having an intensity lower than the intensity of other regions, and
   wherein the chief ray of the diffracted light is tilted from the optical axis of the 0-th order light toward a side of the reference plane, the side including the chief ray of the projected light.

4. The projector according to claim 2,
   wherein the intensity of the diffracted light is reduced from a light beam whose angle with respect to the 0-th order light is the greatest toward a light beam whose angle with respect to the 0-th order light is the smallest on the plane including the optical axis of the 0-th order light and the chief ray of the diffracted light.

5. The projector according to claim 1, further comprising:
   an optical path conversion element that converts an optical path of at least one of light incident on the diffraction element and the diffracted light so that an angle formed between an optical axis of the light source device and the reference plane is reduced.

6. The projector according to claim 5,
   wherein the optical path conversion element is provided on an optical path between the light source device and the diffracted element.

7. The projector according to claim 5,
   wherein the optical path conversion element is a prism.

8. The projector according to claim 1,
   wherein the light from the light source device is vertically incident on an incidence surface of the diffraction element.

9. The projector according to claim 1,
   wherein the light source device includes a plurality of light sources, and
   wherein the projector further includes a superimposing optical system that is provided on an optical path between the diffraction element and the light modulation device.

* * * * *